United States Patent
Mitsui et al.

(10) Patent No.: US 9,751,035 B2
(45) Date of Patent: Sep. 5, 2017

(54) OPERATION METHOD FOR DEZINCIFICATION PLANT

(71) Applicant: SUMITOMO METAL MINING CO., LTD., Tokyo (JP)

(72) Inventors: Hiroyuki Mitsui, Tokyo (JP); Satoshi Matsubara, Tokyo (JP); Osamu Nakai, Tokyo (JP)

(73) Assignee: SUMITOMO WIRING SYSTEMS, LIMITED, Tokyo (JP)

( * ) Notice: Subject to any disclaimer, the term of this patent is extended or adjusted under 35 U.S.C. 154(b) by 200 days.

(21) Appl. No.: 14/760,066

(22) PCT Filed: Dec. 10, 2013

(86) PCT No.: PCT/JP2013/083089
§ 371 (c)(1),
(2) Date: Jul. 9, 2015

(87) PCT Pub. No.: WO2014/109161
PCT Pub. Date: Jul. 17, 2014

(65) Prior Publication Data
US 2015/0352475 A1    Dec. 10, 2015

(30) Foreign Application Priority Data
Jan. 10, 2013    (JP) .................. 2013-002817

(51) Int. Cl.
*C22B 23/00*    (2006.01)
*C01G 9/08*    (2006.01)
(Continued)

(52) U.S. Cl.
CPC .............. *B01D 37/04* (2013.01); *C01G 9/08* (2013.01); *C22B 1/00* (2013.01); *C22B 23/043* (2013.01); *C22B 23/0461* (2013.01)

(58) Field of Classification Search
CPC ... C22B 23/043; C22B 23/0461; B01D 37/04; C01G 9/08
See application file for complete search history.

(56) References Cited

U.S. PATENT DOCUMENTS 7,964,165 B2 *    6/2011    Nakai .................. C01G 9/08
                                                423/101
2010/0034716 A1    2/2010    Nakai

FOREIGN PATENT DOCUMENTS

JP    S57-174112 A    10/1982
JP    H05-23619 A    2/1993
(Continued)

OTHER PUBLICATIONS

Mar. 18, 2014 International Search Report issued in International Patent Application No. PCT/JP2013/083089.
(Continued)

*Primary Examiner* — George Wyszomierski
*Assistant Examiner* — Tima M McGuthry Banks
(74) *Attorney, Agent, or Firm* — Oliff PLC (57) ABSTRACT

At the beginning of a dezincification plant used in a dezincification step in a hydrometallurgical method for nickel, a decrease throughout the dezincification plant is controlled to prevent a decrease in production volume and a cake layer is formed on a filter cloth provided to a filter device inside the dezincification plant. At the beginning of dezincification plant, a slurry containing a formed zinc sulfide is supplied to a filter for filtration and separation, an adjustment is performed in which the flow rate of the slurry is increased to reach a target flow rate in a time T2 which satisfies the following relational expression $3 \times T1 \leq T2 \leq 5 \times T1$, where T1 represents the time between starting a slurry supply and attaining the target flow rate in the case of transferring the
(Continued)

slurry at the maximum liquid transfer capacity of a pump configured to transfer the slurry.

5 Claims, 3 Drawing Sheets

(51) Int. Cl.
    *B01D 37/04*     (2006.01)
    *C22B 3/00*     (2006.01)
    *C22B 1/00*     (2006.01)

(56) References Cited

FOREIGN PATENT DOCUMENTS

| JP | H06-116660 A | 4/1994 |
|---|---|---|
| JP | 2001-120915 A | 5/2001 |
| JP | 2002-121624 A | 4/2002 |
| JP | 2003-326153 A | 11/2003 |
| JP | 2005-350766 A | 12/2005 |
| JP | 2010-037626 A | 2/2010 |

OTHER PUBLICATIONS

Aug. 29, 2016 Search Report issued in European Patent Application No. 13870547.0.

Batyrev et al; "Optimum control of working conditions of filters for separating suspensions, taking into account filter-membrane clogging;" Chemical and Petroleum Engineering Consultants Bureau; Jun. 1, 1982; vol. 18; No. 6; pp. 229-233.

I. Tsirkin; "Pilot plant for investigating filtration;" Chemical and Petroleum Engineering Consultants Bureau; Jun. 1, 1971; vol. 7; No. 6; pp. 535-537.

V. Shpanov; Optimizing liquid filter operation; Chemical and Petroleum Engineering Consultants Bureau; Dec. 1, 1970; vol. 6; No. 12; pp. 1003-1008.

\* cited by examiner

OPERATION METHOD FOR DEZINCIFICATION PLANT

FIELD OF THE INVENTION

The present invention relates to an operation method for a dezincification plant. More specifically, the present invention relates to an operation method for a dezincification plant to perform a dezincification treatment being such that a post-neutralization solution obtained by neutralizing a leachate of a nickel oxide ore is given a sulfurization treatment to form a zinc sulfide, and the zinc sulfide is separated therefrom to obtain a mother liquor for nickel recovery which contains nickel and cobalt. The present application claims priority based on Japanese Patent Application No. 2013-002817 filed in Japan on Jan. 10, 2013. The total contents of the patent application are to be incorporated by reference into the present application.

BACKGROUND ART

In recent years, high pressure acid leach using sulfuric acid has been attracting attention as a hydrometallurgical method for nickel oxide ores. Unlike pyrometallurgy, which is a conventional common refining method for nickel oxide ores, the high pressure acid leach does not include a pyrometallurgical step using reduction and drying plants, but includes a consistent hydrometallurgical step, and thus is advantageous in terms of energy and cost. In addition, this method has another advantage that a sulfide containing nickel and cobalt (hereinafter, sometimes referred to as "a nickel-cobalt mixed sulfide" or "a Ni—Co mixed sulfide") whose nickel grade is improved up to approximately 50% by mass can be obtained.

Examples of a plant to perform a nickel refining treatment by high pressure acid leach include: (a) a leaching and solid-liquid separation plant configured such that sulfuric acid is added to a slurry of a nickel oxide ore to perform a leaching treatment under high temperature and high pressure, and subsequently, multistage washing is applied to a leach slurry, whereby a residue is separated therefrom to obtain a leachate containing an impurity element together with nickel and cobalt; (b) a neutralization plant configured such that the pH of the obtained leachate is adjusted to separate a neutralized precipitate containing the impurity element therefrom, whereby a post-neutralization solution containing zinc together with nickel and cobalt is obtained; (c) a dezincification plant configured such that a sulfurizing agent is added to the post-neutralization solution thereby to form a zinc sulfide, and the zinc sulfide is separated therefrom to obtain a leachate containing nickel and cobalt; and (d) a nickel recovery plant configured such that a sulfurizing agent is added to the leachate thereby to form a mixed sulfide containing nickel and cobalt, and the mixed sulfide is separated therefrom.

Here, in the foregoing dezincification plant (c), the post-neutralization solution discharged from the neutralization plant is introduced into a sulfurization reaction tank, and a sulfurizing agent, such as hydrogen sulfide gas or sodium hydrosulfide, is added thereto to sulfurize zinc, copper, and the like which are contained in the post-neutralization solution. After that, solid-liquid separation is performed using a filter press or the like, whereby a zinc sulfide and a leachate containing nickel and cobalt are obtained. (For example, refer to Patent Literatures 1 and 2.). The nickel-cobalt mixed sulfide is further used as a raw material for purification to obtain electrolytic nickel and electrolytic cobalt, and therefore, the treatment in the dezincification plant requires the concentration of zinc (Zn) contained in the post-neutralization solution to be reduced to not more than 1 mg/L.

Therefore, to the nickel-and-cobalt-containing leachate obtained by the solid-liquid separation of the zinc sulfide with a filter press or the like in the dezincification plant, a further filtration treatment is applied so that a minute zinc sulfide precipitate which cannot be separated by the solid-liquid separation is removed. As a filter for the filtration treatment, for example, a polishing filter is used.

Commonly, a start-up operation of a dezincification plant including a filter after the completion of a plant periodic inspection or the like is performed in such a manner that the flow rate of a liquid transfer pump is set to be low in the beginning, and then, the flow rate is gradually and continuously increased to transfer a slurry in a long time, and, at the timing when a certain amount of a zinc precipitate is coated on the surface of a filter cloth provided to the filter, the flow rate is made to reach a flow rate in a normal operation (a target flow rate). Then, after a shift to the normal operation, what is called cake filtration is performed on the basis of the coating layer (cake layer) of the zinc precipitate formed on the surface of the filter cloth.

However, as mentioned above, the coating of the surface of the filter cloth with the precipitate takes a long time. Specifically, for example, in a factory (a plant) capable of producing a Ni—Co mixed sulfide on a scale of approximately 10,000 tons per year (in terms of the volume of nickel), the coating with the precipitate sometimes takes a long time, namely, approximately one day. This causes a considerable decrease in the operating rate and a decrease in the volume of production of a Ni—Co mixed sulfide.

That is, during the coating of the surface of the filter cloth with the precipitate, the flow rate of the slurry transferred to the filter of the dezincification plant is lower than the flow rate in a normal operation, and, accordingly, the throughput in the dezincification plant decreases. Hence, in response to the decrease in throughput in the dezincification plant, the operating rate of the whole process including the neutralization plant used in the upstream step needs to be decreased, and as a result, the volume of production is considerably decreased. Specifically, for example, in the case of the plant capable of producing a Ni—Co mixed sulfide on a scale of approximately 10,000 tons per year (in terms of the volume of nickel), at the time of start-up of the dezincification plant, the operating rate of the whole process needs to be decreased to approximately 80%.

At this time, if a measure of decreasing the operating rate of the whole process is not taken, then, a slurry which should be transferred to the dezincification plant (a slurry which cannot be treated in time) overflows from a buffer tank provided between the dezincification plant and the neutralization plant used in the upstream step. Furthermore, in a buffer tank between the dezincification plant and the nickel recovery plant used for the downstream step, a slurry to be accommodated runs short, and the plant operating rate decreases, accordingly.

To prevent such decrease in production volume, for example, there can be taken a measure of installing buffer tanks larger than ever at the points ahead and behind of a filter, or a measure of installing more filters. However, these measures have problems that a high initial investment is required, thereby reducing economic efficiency, and furthermore, there is a limit to installation space.

Alternatively, there can be considered a measure of extremely increasing a supply flow rate after the coating (called "ramp-up"), but, this measure causes a problem that an excessive load is applied to a purification filter. Alternatively, there can be mentioned a measure of rapidly supplying a slurry from the time of plant start-up at the maximum pumping capacity, but, a formed cake layer is not good because the layer is almost in a state of clogging due to the zinc sulfide which coats the layer, and accordingly, filtering accuracy decreases. Furthermore, in these cases, the life of the filter cloth is considerably shortened, whereby the frequency of replacement of a filter cloth, the frequency of maintenance thereof, and the like are increased, and accordingly, treatment efficiency is further lowered.

Thus, from a viewpoint of securing a stable production volume, the feasibility of any of the foregoing measures is low.

PRIOR-ART DOCUMENTS

Patent Documents

Patent document 1: Japanese Patent Application Laid-Open No. H06-116660
Patent document 2: Japanese Patent Application Laid-Open No. 2005-350766
Patent document 3: Japanese Patent Application Laid-Open No. 2010-037626

SUMMARY OF THE INVENTION

Problems to be Solved by the Invention

The present invention is proposed in view of such actual circumstances, and an object of the present invention is to provide an operation method for a dezincification plant, the method making it possible that, at the time of start-up of the dezincification plant used in a dezincification step in a hydrometallurgical method for nickel, a decrease in throughput in the dezincification plant is controlled to prevent a decrease in production volume, and also, an excellent cake layer is formed on a filter cloth provided to a filter device in the dezincification plant, whereby an efficient filtration treatment is performed.

Means to Solve the Problems

The present inventors earnestly studied to achieve the foregoing object. As a result, the inventors found that a stagewise adjustment of the flow rate of a slurry supplied to the filter device so as to attain a target flow rate within a predetermined time enables a start-up operation to be completed in a shorter time than ever and a coating with a zinc sulfide to form an excellent cake layer.

That is, an operation method for a dezincification plant according to the present invention is configured to perform a dezincification treatment which is such that, in a hydrometallurgical method for a nickel oxide ore, a post-neutralization solution obtained by neutralizing a leachate of the nickel oxide ore and containing zinc together with nickel and cobalt is given a sulfurization treatment to form a zinc sulfide, and the zinc sulfide is separated and removed, in which, when, upon start-up of the dezincification plant, a slurry containing the zinc sulfide formed by adding a sulfurizing agent to the post-neutralization solution is supplied to a filter for filtration and separation, an adjustment is performed in such a manner that the flow rate of the slurry supplied to the filter is increased in stages to reach a target slurry flow rate in a time T2 which satisfies the following relational expression (i), where T1 represents a time between starting a slurry supply and attaining the target slurry flow rate in the case of transferring the slurry at the maximum liquid transfer capacity of a pump configured to transfer the slurry.

$$3 \times T1 \leq T2 \leq 5 \times T1 \qquad (i)$$

Here, each of the stages has a step of increasing a slurry flow rate and a step of maintaining the slurry flow rate. Furthermore, in the step of increasing the slurry flow rate in each of the stages, the slurry flow rate is preferably increased by transferring the slurry at the maximum liquid transfer capacity of the pump.

Furthermore, the slurry flow rate is preferably adjusted so as to be increased in stages, namely, in three stages to six stages.

The hydrometallurgical method for the nickel oxide ore includes: a leaching step in which sulfuric acid is added to a slurry of the nickel oxide ore to perform leaching under high temperature and high pressure; a solid-liquid separation step in which multistage washing is applied to a leach slurry to separate a residue therefrom, whereby a leachate containing an impurity element together with nickel and cobalt is obtained; a neutralization step in which the pH of the leachate is adjusted to separate a neutralized precipitate containing the impurity element therefrom, whereby a post-neutralization solution containing zinc together with nickel and cobalt is obtained; a dezincification step in which a sulfurization treatment is applied to the post-neutralization solution to form a zinc sulfide, and the zinc sulfide is separated therefrom to obtain a mother liquor for nickel recovery which contains nickel and cobalt; and a nickel recovery step in which a sulfurization treatment is applied to the mother liquor for nickel recovery to form a mixed sulfide containing nickel and cobalt.

Effects of the Invention

The present invention makes it possible that, at the time of start-up of a dezincification plant, a start-up operation is performed in a shorter time, and a decrease in throughput in the dezincification plant is controlled to prevent a decrease in production volume, and also, an excellent cake layer is formed on a filter cloth provided to a filter device, whereby efficient filtration is performed.

DETAILED DESCRIPTION OF THE INVENTION

Hereinafter, an operation method for a dezincification plant according to the present invention will be explained in the following order with reference to the drawings. It should be noted that the present invention is not limited only to the following embodiment, and various changes can be made within the scope not deviating from the gist of the present invention.
1. Summary of the present invention
2. Hydrometallurgical method for nickel oxide ore
3. Each step of the hydrometallurgical method
   3-1. Leaching step
   3-2. Solid-liquid separation step
   3-3. Neutralization step
   3-4. Dezincification step
   3-4-1. Dezincification plant
   3-4-2. Operation method for the dezincification plant (operation method at the time of plant start-up)
   3-5. Nickel recovery step (nickel-cobalt mixed sulfide formation step)
4. Examples

1. SUMMARY OF THE PRESENT INVENTION

The operation method for the dezincification plant according to the present invention is an operation method for a dezincification plant used in a dezincification step in a hydrometallurgical process for a nickel oxide ore. More specifically, the operation method for the dezincification plant is configured to perform a dezincification treatment being such that a post-neutralization solution obtained by neutralizing a leachate of a nickel oxide ore is given a sulfurizing treatment to form a zinc sulfide, and the zinc sulfide is separated therefrom to obtain a mother liquor for nickel recovery which contains nickel and cobalt.

In this dezincification plant, there is performed a filtration treatment being such that a slurry which is a post-dezincification solution containing a formed zinc sulfide (a solution obtained after a dezincification reaction) is supplied to a filtration filter (a filter cloth) such as a polishing filter, whereby the zinc sulfide as a precipitate is separated and removed. In this filtration treatment, a zinc sulfide (a zinc sulfide precipitate) is appropriately coated on the filter surface of a filter to form a cake layer, whereby cake filtration is performed.

However, for example, at the time of the start-up after a periodic inspection, a slurry flow rate is low, and accordingly it takes many hours to newly coat the surface of the filter with a zinc sulfide and form an appropriate cake layer. Furthermore, as mentioned above, the slurry flow rate is low during the coating on the surface of the filter cloth, and therefore, the throughput in this dezincification plant decreases, and as a result, the operating rate of the whole process decreases, and the volume of production is reduced.

From this viewpoint, the operation method for the dezincification plant according to the present invention allows the surface of the filter cloth to be coated with a zinc sulfide in a short time at the time of the start-up after an periodic inspection, and therefore, a decrease in throughput in the dezincification plant is controlled, whereby a decrease in the operating rate of the whole process can be prevented.

Furthermore, this operation method allows a particularly excellent cake layer to be formed by coating with a zinc sulfide, and therefore, the load on the filter cloth can be reduced, and a reduction in the life of the filter cloth is prevented, whereby an efficient operation can be established.

Figure 1:
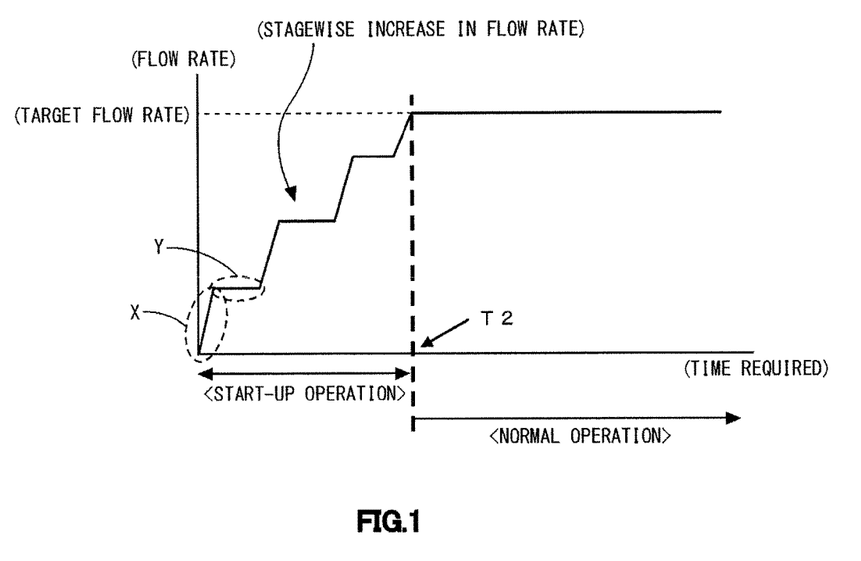
FIG. 1 is a graph showing the relationship between a slurry flow rate and the time required in the case where the slurry flow rate is increased in stages in the time T2.

Specifically, the operation method for the dezincification plant according to the present invention is characterized in that, at the time of start-up of the dezincification plant, when a slurry which contains a zinc sulfide formed by adding a sulfurizing agent to a post-neutralization solution is supplied to a filter for filtration and separation as shown in the graph in FIG. 1, an adjustment is performed in such a manner that the flow rate of the slurry supplied to the filter is increased in stages to reach a target slurry-flow-rate in a time T2 which satisfies the following relational expression (i), where T1 represents the time between starting a slurry supply and attaining the target slurry-flow-rate in the case of transferring the slurry at the maximum liquid transfer capacity of a pump configured to transfer the slurry.

$$3 \times T1 \le T2 \le 5 \times T1 \quad \text{(i)}$$

Here, as will be described in detail later, in the adjustment by increasing the flow rate in stages, "in stages" means the state of an adjustment being such that, taking "a step of increasing a flow rate" and "a step of maintaining the flow rate" as one set, a plurality of the sets (a plurality of stages) is performed every predetermined time.

As mentioned above, an adjustment is performed in such a manner that a slurry flow rate is increased in stages within a predetermined time to reach a target flow rate, whereby the coating with a zinc sulfide which is to form a more excellent cake layer in a shorter time than ever can be realized, and a decrease in the operating rate of the whole process due to a decrease in the throughput of the plant can be prevented.

Hereinafter, a specific embodiment adopting the present invention will be described in more details.

2. HYDROMETALLURGICAL METHOD FOR NICKEL OXIDE ORE

To give a description of an operation method for a dezincification plant according to the present embodiment, a hydrometallurgical method for a nickel oxide ore which includes a dezincification step using the dezincification plant will be described first. This hydrometallurgical method for a nickel oxide ore is a hydrometallurgical method in which nickel and cobalt are leached and recovered from a nickel oxide ore by making use of, for example, high pressure acid leach (HPAL).

Figure 2:
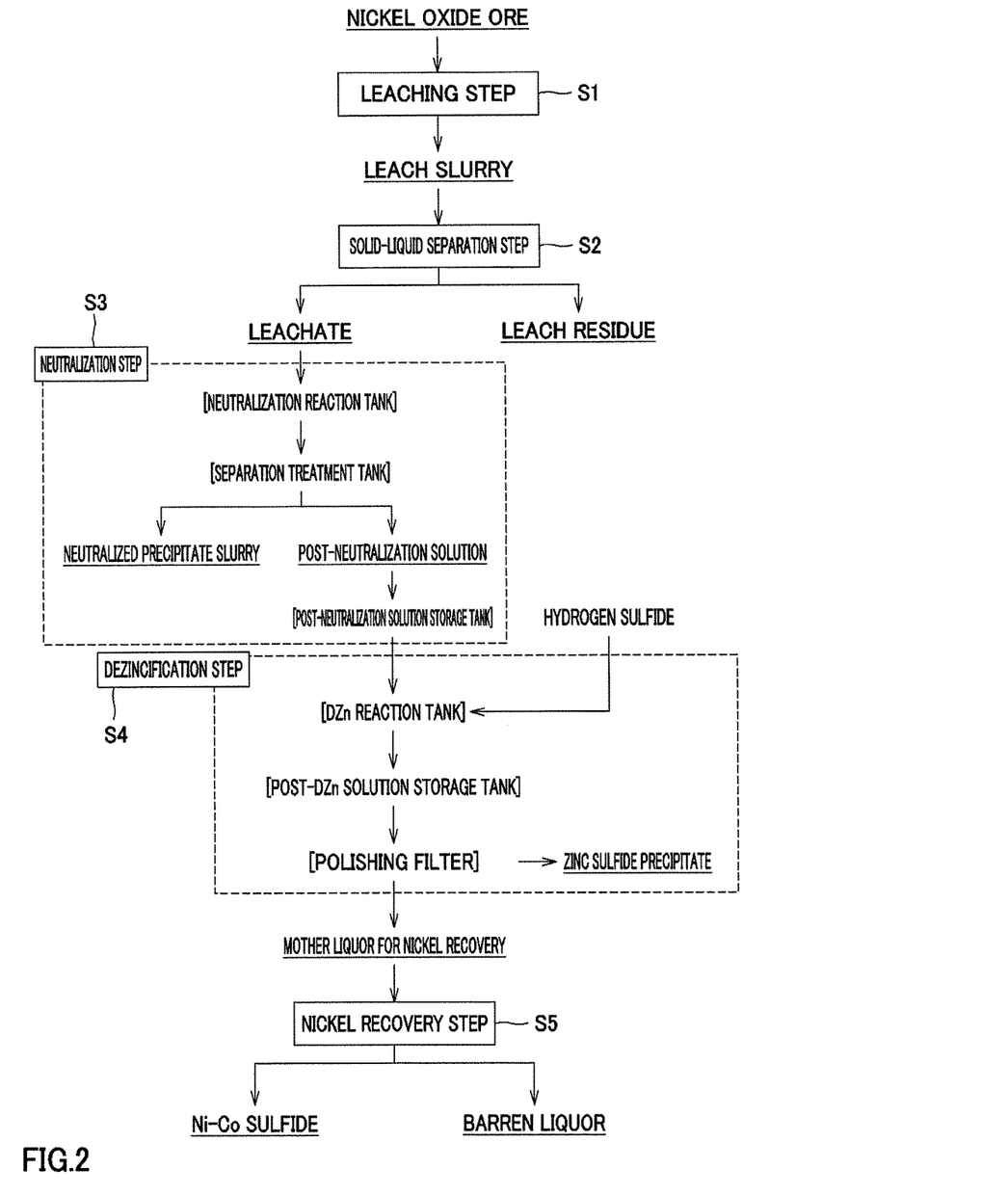
FIG. 2 is a flowchart of a hydrometallurgical method for a nickel oxide ore by using high pressure acid leach.

FIG. 2 illustrates an example of a flowchart (a process chart) of the hydrometallurgical method for a nickel oxide ore by high pressure acid leach. As illustrated in FIG. 2, the hydrometallurgical method for a nickel oxide ore comprises: a leaching step S1 in which sulfuric acid is added to a slurry of a nickel oxide ore to perform leaching under high temperature and pressure; a solid-liquid separation step S2 in which multistage washing is applied to a leach slurry to separate a residue therefrom, whereby a leachate containing an impurity element together with nickel and cobalt is obtained; a neutralization step S3 in which the pH of the leachate is adjusted to separate a neutralized precipitate containing the impurity element therefrom, whereby a post-neutralization solution containing zinc together with nickel and cobalt is obtained; a dezincification step S4 in which a sulfurizing agent such as hydrogen sulfide gas is added to the post-neutralization solution to form a zinc sulfide, and the zinc sulfide is separated and removed therefrom to obtain a mother liquor for nickel recovery which contains nickel and cobalt; and a nickel recovery step S5 in which a sulfurizing agent is added to the mother liquor for nickel recovery to form a mixed sulfide containing nickel and cobalt. Hereinafter, each of the steps will be specifically explained.

3. EACH STEP IN THE HYDROMETALLURGICAL METHOD

<3-1. Leaching Step>

In the leaching step S1, a leaching treatment using, for example, high pressure acid leach is applied to a nickel oxide ore. Specifically, sulfuric acid is added to an ore slurry obtained by crushing a nickel oxide ore as a raw material, and, for example, using a high temperature pressurizing tank (autoclave), the ore slurry is pressurized under a high temperature of 220 to 280° C. to be agitated, whereby a leach slurry including a leachate and a leach residue is formed.

Laterite ore, such as limonite ore or saprolite ore, is mainly employed as the nickel oxide ore used in the leaching step S1. The nickel content of a laterite ore is usually 0.8% to 2.5% by weight, and the nickel is contained in the form of a hydroxide or a magnesium silicate mineral. Furthermore, the iron content of a laterite ore is 10% to 50% by weight, and the iron is contained mainly in the form of trivalent hydroxide (goethite), but, a magnesium silicate mineral contains some divalent iron. Furthermore, besides such laterite ore, an oxide ore containing valuable metals, such as nickel, cobalt, manganese, and copper, for example, a manganese lump present in a deep seabed is used in the leaching step S1.

In the leaching treatment in the leaching step S1, leaching reactions and high temperature hydrolysis reactions which are represented by the following formulas (1) to (5) occur, whereby nickel, cobalt, and the like are leached out in the form of sulfate and a leached-out iron sulfate is fixed as hematite. It should be noted that, since the fixation of iron ions does not completely proceed, besides nickel, cobalt, and the like, divalent and trivalent iron ions are usually contained in a liquid portion of an obtained leach slurry.

Leaching reaction $$MO + H_2SO_4 \rightarrow MSO_4 + H_2O \quad (1)$$

(where M represents Ni, Co, Fe, Zn, Cu, Mg, Cr, Mn, or the like.)

$$2Fe(OH)_3 + 3H_2SO_4 \rightarrow Fe_2(SO_4)_3 + 6H_2O \quad (2)$$

$$FeO + H_2SO_4 \rightarrow FeSO_4 + H_2O \quad (3)$$

High temperature hydrolysis reaction $$2FeSO_4 + H_2SO_4 + \tfrac{1}{2}O_2 \rightarrow Fe_2(SO_4)_3 + H_2O \quad (4)$$

$$Fe_2(SO_4)_3 + 3H_2O \rightarrow Fe_2O_3 + 3H_2SO_4 \quad (5)$$

The amount of sulfuric acid added in the leaching step S1 is not particularly limited, and an excessive amount enough to leach iron contained in an ore is employed. For example, 300 to 400 kg of sulfuric acid is added per ton of ore. When the amount of sulfuric acid added per ton of ore exceeds 400 kg, sulfuric acid cost becomes higher, which is not preferable.

It should be noted that, from a viewpoint of filterability of a hematite-containing leach residue formed in the subsequent solid-liquid separation step S2, an adjustment is preferably performed in the leaching step S1 so that an obtained leachate has a pH of 0.1 to 1.0.

<3-2. Solid-Liquid Separation Step>

In the solid-liquid separation step S2, multistage washing is applied to the leach slurry formed in the leaching step S1, whereby a leachate and a leach residue containing zinc as an impurity element besides nickel and cobalt are obtained.

In the solid-liquid separation step S2, the leach slurry is mixed with a washing liquid, and then, solid-liquid separation using a solid-liquid separation apparatus such as a thickening apparatus is applied thereto. Specifically, first, the slurry is diluted by a washing liquid, and then, a leach residue in the slurry is condensed as a precipitate in the thickening apparatus. This allows the amount of nickel adhering to the leach residue to be reduced depending on the degree of the dilution. In actual operations, thickening apparatuses having such function are multistage-connected and used, whereby the recovery rates of nickel and cobalt are improved.

The multistage washing in the solid-liquid separation step S2 is not particularly limited, but there is preferably used a counter current decantation method (CCD method) configured to bring the slurry into contact with a countercurrent of a washing liquid containing no nickel. Thus, a washing liquid to be newly introduced in a system can be cut down, while the recovery rates of nickel and cobalt of not less than 95% can be achieved.

The washing liquid is not particularly limited, and a washing liquid which contains no nickel and does not affect the step may be used. Among such washing liquids, a washing liquid having a pH of 1 to 3 is preferably employed. This is because, in the case where aluminum is contained in the leachate, a washing liquid having a high pH causes a bulky aluminum hydroxide to be formed, thereby leading to poor sedimentation of a leach residue inside a thickening apparatus. Hence, as the washing liquid, a barren liquor having a low pH (a pH of approximately 1 to 3) which is obtained by the nickel recovery step S5 as a downstream step is preferably repeatedly used.

<3-3. Neutralization Step>

In the neutralization step S3, the pH of the leachate separated in the solid-liquid separation step S2 is adjusted, whereby a neutralized precipitate containing an impurity element is separated therefrom, and a post-neutralization solution containing zinc together with nickel and cobalt is obtained.

Specifically, in the neutralization step S3, while oxidation of the separated leachate is controlled, a neutralizer such as calcium carbonate is added to the leachate so that a post-neutralization solution obtained has a pH of not more than 4, preferably a pH of 3.0 to 3.5, more preferably a pH of 3.1 to 3.2, whereby the post-neutralization solution to serve as a source of a mother liquor for nickel recovery and a neutralized precipitate slurry containing trivalent iron as an impurity element are formed. In the neutralization step S3, such neutralization treatment applied to the leachate allows an excessive acid used in the leaching treatment by high pressure acid leach to be neutralized, whereby a post-neutralization solution to serve as a source of a mother liquor for nickel recovery is formed, and also, impurities, such as trivalent iron ions and aluminum ions, which remain in the solution are removed as neutralized precipitates.

Furthermore, in the neutralization step S3, the neutralized precipitate and a suspended solid including the leach residue obtained in the leaching step S1 are preferably made to remain in the post-neutralization solution so that the post-neutralization solution (a pre-sulfurization solution) which is to be transferred to a dezincification reaction tank in the subsequent dezincification step S4 has a turbidity of 100 to 400 NTU. Such adjustment of the turbidity of the post-neutralization solution by making the suspended solid remain allows the filterability of a dezincification sulfide formed in the dezincification step S4 to be improved.

Here, as shown in the neutralization step S3 in the flowchart of FIG. 2, a neutralization plant to be employed in the neutralization step S3 includes: a neutralization reaction tank configured to perform a neutralization reaction; a separation treatment tank configured to separate a neutralized precipitate slurry and a post-neutralization solution; and a post-neutralization solution storage tank configured to store the separated post-neutralization solution.

The leachate separated in the foregoing solid-liquid separation step S2 is fed into the neutralization reaction tank and a neutralizer is added to the leachate, whereby a neutralization reaction on the leachate occurs.

The separation treatment tank is a solid-liquid separation apparatus such as a thickening apparatus. Into the separation treatment tank, a post-neutralization slurry formed by the neutralization reaction on the leachate in the neutralization reaction tank is transferred and fed, and the slurry is separated into a post-neutralization solution to serve as a source of a mother liquor for nickel recovery and a neutralized precipitate slurry containing trivalent iron as an impurity element. The post-neutralization solution obtained by separating the neutralized precipitate therefrom in the separation treatment tank overflows from the tank to be transferred to the post-neutralization solution storage tank, meanwhile, the neutralized precipitate slurry is extracted from the bottom of the separation treatment tank. It should be noted that the neutralized precipitate slurry extracted from the bottom of the separation treatment tank can be suitably repeatedly returned to the solid-liquid separation step S2.

The post-neutralization solution storage tank is configured so that the post-neutralization solution overflowing from the separation treatment tank is fed into the storage tank and temporarily stored before being transferred to the dezincification step S4 subsequent to the neutralization step S3. That is, the post-neutralization solution storage tank serves as a buffer tank arranged between the neutralization plant and the dezincification plant used in the dezincification step S4, and allows the flow rate of the post-neutralization solution transferred to be adjusted according to the progress state of treatment in the dezincification plant.

The post-neutralization solution storage tank is not particularly limited, but, for example, a storage tank having a volume equivalent to not less than 3-hour storage volume with respect to the flow rate of the post-neutralization solution is preferably employed. Such post-neutralization solution storage tank allows a residence time of the post-neutralization solution in the post-neutralization solution storage tank to be longer.

<3-4. Dezincification Step>

In the dezincification step S4, a sulfurizing agent such as hydrogen sulfide gas is added to the post-neutralization solution obtained by the neutralization step S3 to sulfurize the post-neutralization solution, whereby a zinc sulfide is formed, and the zinc sulfide is separated and removed to obtain a mother liquor for nickel recovery which contains nickel and cobalt (a post-dezincification solution).

Specifically, for example, the post-neutralization solution containing zinc together with nickel and cobalt is introduced into a pressurized container, and hydrogen sulfide gas is blown into a gas phase thereof, whereby zinc is selectively sulfurized in contrast to nickel and cobalt, and thus, a zinc sulfide and a mother liquor for nickel recovery are formed. It should be noted that the flowchart of FIG. 2 shows an example of using hydrogen sulfide gas as a sulfurizing agent.

<3-4-1. Dezincification Plant>

Here, a dezincification plant to be employed in the dezincification step S4 will be described. As shown in the dezincification step S4 in the flowchart of FIG. 2, the dezincification plant includes: a dezincification (DZn) reaction tank configured to perform a sulfurization reaction by blowing a sulfurizing agent such as hydrogen sulfide gas into the post-neutralization solution; a post-dezincification (DZn) solution storage tank configured to store a slurry including a formed zinc sulfide and a post-sulfurization solution; and a filter device configured to separate and remove the zinc sulfide (zinc sulfide precipitate).

(Dezincification Reaction Tank)

In the dezincification reaction tank, the post-neutralization solution obtained in the foregoing neutralization step S3 and transferred is fed, and hydrogen sulfide gas is added to the post-neutralization solution to perform a sulfurization reaction. In this dezincification reaction tank, the addition of hydrogen sulfide gas allows the formation of a zinc sulfide on the basis of zinc contained in the post-neutralization solution. Furthermore, a solution obtained after the sulfurization treatment in the dezincification reaction tank (a post-dezincification solution) does not contain zinc and serves as a mother liquor for nickel recovery.

Then, a slurry as the post-dezincification solution containing the zinc sulfide formed in the dezincification reaction tank is transferred to the post-dezincification solution storage tank.

(Post-Dezincification Solution Storage Tank)

Into the post-dezincification solution storage tank, a slurry of the post-dezincification solution containing the zinc sulfide obtained in the dezincification reaction tank is fed. In the post-dezincification solution storage tank, the slurry supplied from the dezincification reaction tank is temporarily stored before being transferred to the filter device configured to separate and remove the zinc sulfide contained in the slurry.

Furthermore, in the post-dezincification solution storage tank, a slurry flow rate at the time of transferring the slurry to the filter device can be adjusted. Specifically, for example, at the time of start-up of the dezincification plant, the slurry can be transferred to the filter device with increasing the flow rate of the slurry in stages so as to achieve a target flow rate within a predetermined time. Furthermore, in a normal operation, with a predetermined target flow rate being maintained, the slurry can be transferred. Thus, the post-dezincification solution storage tank is capable of controlling the flow rate of the slurry transferred to the filter device, and accordingly, an excellent cake layer can be formed on the surface of the filter cloth in the filter device in a shorter time, whereby a decrease in the operating rate of the whole process can be prevented.

Here, the slurry which is stored in the post-dezincification solution storage tank and transferred to the filter device, that is, the slurry obtained after the dezincification treatment is not particularly limited, but, for example, the slurry has a temperature of approximately 50 to 80° C., a solid content of approximately 0% to 1% by weight, and a pH of approximately 2.4 to 4.0.

(Filter Device)

The filter device is configured with a polishing filter and the like, and equipped with a filter (a filter cloth) having a predetermined mesh, and the like. In the filter device, the zinc sulfide is separated and removed from the zinc-sulfide-containing slurry which is transferred via a pipe or the like from the post-dezincification solution storage tank.

In the filter device, a certain amount of a zinc sulfide precipitate is coated on the surface of the filter cloth to form a cake layer (hereinafter, sometimes referred to as a coating layer), whereby there is performed cake filtration in which the cake layer is made to act as what is called a filter material. The coating of the surface of the filter cloth with the precipitate is performed with adjusting the amount of the slurry at the time of start-up of the dezincification plant. Evaluation of the properties of the cake layer formed by the coating of the filter cloth with the precipitate is made in such a manner that, for example, in the case where the time between plant start-up and a later-mentioned performance improvement action for the filter cloth, such as a reverse washing treatment or replacement of the filter cloth, performed at the time of occurrence of clogging is taken as one period, if the amount of the slurry flowing during this period is large, then it can be judged that a coating of the precipitate is appropriately made to form an excellent cake layer, on the other hand, if the amount of the slurry flowing during this period is small, then it can be judged that the coating is inappropriately made and a poor cake layer is formed accordingly.

The filter cloth used for the filter device is not particularly limited, but, a filter cloth, for example, made of polypropylene and having a filtration flow rate load of approximately 0.5 to 3.0 $m^3/H \cdot m^2$ may be suitably used.

The filter device may take a form being such that the foregoing filter cloth is supported by, for example, a basket-like support frame. The material of the support frame is not particularly limited, and may be made of, for example, titanium or stainless steel. Furthermore, the filtration area (filterable area) in the filter device is not particularly limited, and may be suitably set according to a target slurry flow rate and the like, but, is preferably set at approximately 10 to 30 $m^2$, for example.

Here, for example, in a filter device such as a polishing filter, a filter cloth thereof is sometimes clogged up. The clogging of the filter cloth can be judged by monitoring the difference between the pressure of the slurry supplied to the polishing filter and the pressure of the slurry discharged from the polishing filter, that is, a pressure difference therebetween. Depending on the scale of a plant or a factory, for example, at the time when the difference pressure reaches 100 kPaG, it can be generally judged that the clogging has occurred.

In the case where such clogging occurs, reverse washing is preferably performed in such a manner that warm water or the like is made to flow through the polishing filter from a direction opposite to a regular liquid-flowing direction, whereby minute particles causing the clogging are washed away. It should be noted that, usually, this reverse washing operation is performed after the operation of all plants is stopped (plant shut-down) and liquid discharge is conducted. Then, a subsequent inspection and a plant start-up operation are performed to make the plants return to normal operation. Hence, the reverse washing operation leads to a considerable decrease in operating rate.

Furthermore, in the case where the degree of clogging is high to the extent that the performance of a filter cloth is not recovered even by performing the foregoing reverse washing (for example, the clogging cannot be eliminated, or, immediately after the operation, the difference pressure is returned again to a predetermined value), the filter cloth needs to be replaced. Also in this case, it takes a longer time to return to normal operation, and in addition, the cost of a filter cloth increases.

Hence, to prevent a decrease in operating rate and to make an efficient operation possible, it is desired to prevent as much as possible the requirement of such reverse washing operation and the occurrence of filter cloth clogging which requires the replacement of a filter cloth itself.

<3-4-2. Operation Method for the Dezincification Plant (Operation Method at the Time of Plant Start-Up)>

In the start-up of the dezincification plant including the filter device after the completion of a periodic plant inspection and the like, it is necessary that a slurry obtained after the dezincification treatment is transferred to the filter device and a predetermined amount of zinc precipitate is coated on the surface of the filter cloth to form a cake layer.

Figure 3:
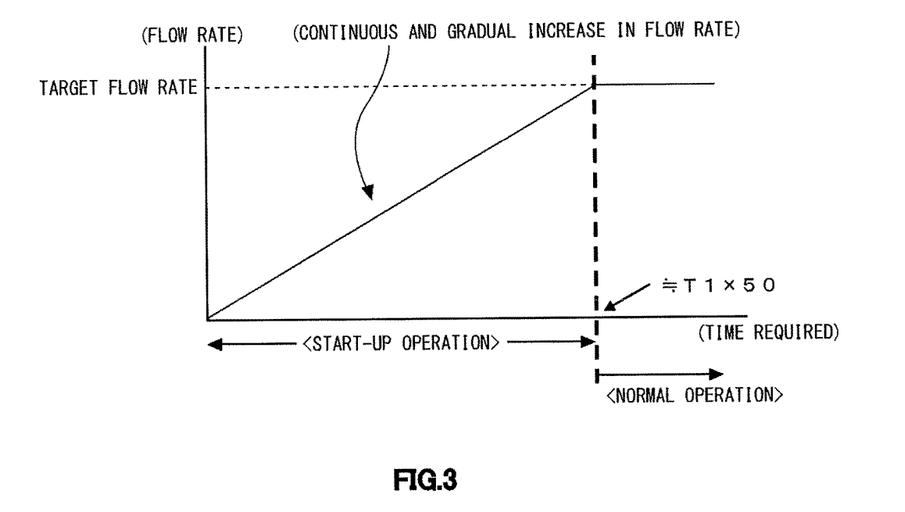
FIG. 3 is a graph showing the relationship between a slurry flow rate and the time required in the case where the slurry flow rate is continuously and gradually increased.

In the conventional method, for example, as shown in the graph of FIG. 3, the supply flow rate of the pump configured to transfer the slurry (the liquid transfer pump) is set so as to be low immediately after starting a start-up operation, and, as the time proceeds, the flow rate is continuously and gradually increased and the slurry is transferred by taking a long time, whereby a predetermined amount of zinc precipitate is coated on the surface of the filter cloth. Then, there is performed an operation in which the flow rate is made to reach a flow rate in a normal operation (a target flow rate) at the timing when a predetermined amount of the cake layer is formed.

Such start-up operation has advantages that a particularly excellent cake layer is formed and the occurrence of clogging of the filter cloth is prevented, whereby filtering accuracy can be improved. However, as understood from the graph of FIG. 3, in the case of an operation in which the supply flow rate of the slurry is continuously and gradually increased from a low flow rate, a considerably long time is required for the start-up operation, and accordingly the throughput in the dezincification plant decreases until a normal operation is started. Furthermore, such decrease in the throughput in the dezincification plant requires a reduction in the amount of the post-neutralization solution supplied from the neutralization plant, and moreover, inevitably causes a decrease in the amount of the mother liquor for nickel recovery supplied from the dezincification plant to the nickel recovery plant used in the subsequent step. In this case, the operating rate of the whole process for nickel refining considerably decreases, whereby the volume of production of a nickel cobalt mixed sulfide decreases.

Figure 4:
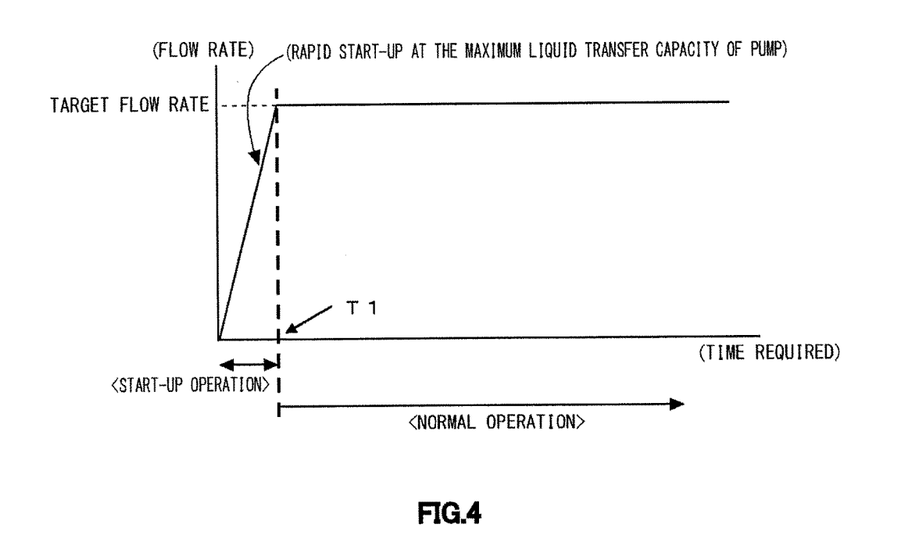
FIG. 4 is a graph showing the relationship between a slurry flow rate and the time required in the case where the slurry flow rate is rapidly increased at the maximum liquid transfer capacity of a liquid transfer pump.

On the other hand, in order to shorten the time required to form the coating layer on the surface of the filter cloth, for example, as shown in FIG. 4, the slurry is rapidly transferred at the maximum liquid transfer capacity of a liquid transfer pump immediately after starting the start-up operation. In this case, the time required to form the coating layer is T1 (for example, approximately 30 minutes), and thus, a decrease in the throughput of the dezincification plant can be prevented. However, when such operation is performed, the cake layer formed on the surface of the filter cloth is nearly clogged up, and therefore, a considerable reduction in the life of the filter cloth is caused, and, as a result, the frequency of work such as filter cloth replacement is increased and the operating rate of the whole process is lowered.

Therefore, in the present embodiment, at the time of start-up of the dezincification plant, when the slurry containing the zinc sulfide is supplied to the filter device, an adjustment is performed in such a manner that a slurry flow rate is increased in stages to reach a target flow rate within a predetermined time. Specifically, as shown in the graph of FIG. 1, an adjustment is performed in such a manner that the flow rate of the slurry supplied to the filter device is increased in stages to reach a target slurry-flow-rate in the time T2 which satisfies the following relational expression (i), where T1 represents the time between starting a slurry supply and attaining the target slurry-flow-rate in the case of transferring the slurry at the maximum liquid transfer capacity of a liquid transfer pump configured to transfer the slurry.

$$3 \times T1 \leq T2 \leq 5 \times T1 \quad (i)$$

T1 which represents the time between starting a slurry supply and attaining the target slurry-flow-rate in the case of transferring the slurry at the maximum liquid transfer capacity of a liquid transfer pump is the time that elapses before the completion of the start-up operation (the start of a normal operation) as shown in the graph of FIG. 4.

Furthermore, in the adjustment by increasing in stages, "in stages" means the state of an adjustment being such that, as shown in the graph of FIG. 1, taking "a step of increasing the flow rate" and "a step of maintaining the flow rate" as one set, a plurality of the sets (a plurality of stages) is performed every predetermined time.

More specifically, first, there is performed a first step in which, immediately after starting the start-up operation, an operation of increasing a slurry flow rate is performed for a certain time period at the maximum liquid transfer capacity of a liquid transfer pump, that is, at the maximum supply flow rate (a circled portion X in FIG. 1). That is, the flow rate is adjusted so that the gradient of the flow rate of the slurry with respect to the time required to the time immediately after starting the start-up in the graph of FIG. 1 becomes equal to the gradient of increase in slurry flow rate with respect to the time required from immediately after starting the start-up in the graph of FIG. 4.

Next, a second step is performed in such a manner that, after the certain time period elapses, the liquid transfer pump is operated so that the flow rate at that point is maintained for a predetermined time, whereby the flow rate is adjusted (a circled portion Y in FIG. 1).

Then, taking the first step (X) and the second step (Y) as one set (one stage), the set is repeated every predetermined time, whereby the slurry flow rate can be adjusted in such a way as to increase the flow rate in stages. The slurry flow rate is thus increased in stages, and, when the slurry flow rate reaches a slurry flow rate in a normal operation (a target flow rate), a pump operation is adjusted so as to maintain that slurry flow rate.

It should be noted that the liquid transfer pump can be easily controlled in the first step and the second step by, for example, the inverter control of electric power supplied to the pump.

In the present embodiment, as mentioned above, a flow rate adjustment is performed in such a manner that the flow rate of the slurry supplied to the filter device is increased in stages in the time T2 satisfying the relation of "$3 \times T1 \leq T2 \leq 5 \times T1$", whereby the time required for the start-up operation is made shorter, and moreover, an excellent cake layer can be formed on the surface of the filter cloth. This allows a decrease in the throughput in the dezincification plant to be held to a minimum and a decrease in the operating rate of the whole process to be prevented.

Here, a mechanism of the appearance of effects caused by such flow rate control at the time of the start-up can be considered as follows. That is, in order to satisfactorily perform coating with a precipitate, generally, it is desirable that, as in the conventional method shown in FIG. 3, a slurry is gradually supplied at a low flow rate in a long time. This is because the cake layer is formed by the slow adherence of minute particles (dezincification precipitates which are too small to separate by solid-liquid separation) to the surface of the filter cloth, and furthermore, the cake layer is formed so as to have a small crevice which serves as a liquid flow path in the cake layer. Furthermore, that is because the cake layer needs to grow in thickness to the extent of not being broken even when the flow rate reaches a flow rate in a normal operation (a target flow rate).

From this viewpoint, as shown in FIG. 4, in the case where the slurry is rapidly supplied to attain an usual flow rate from immediately after the start-up, the flow rate reaches a target flow rate in a short time, but, the too high flow rate causes a formed cake layer to be easily broken and an appropriate liquid-flow-path not to be formed in the cake layer, and hence an excellent cake layer can be attained.

On the contrary, as shown in FIG. 1, when a flow rate adjustment is performed in such a manner that the flow rate of the slurry supplied to the filter device is increased in stages in the time T2 satisfying the relation of "$3 \times T1 \leq T2 \leq 5 \times T1$", minute particles firmly adhere, and moreover, a liquid flow path is sufficiently formed in the step of maintaining a flow late (the second step (Y)) in each stage. Furthermore, in the subsequent step of increasing a flow rate, the cake layer sufficiently grows without being broken. Thus, an excellent cake layer can be formed in a short time.

As mentioned above, it is important that the time T2 that elapses before a slurry flow rate reaches a target flow rate by being increased in stages satisfies the relation of "$3 \times T1 \leq T2 \leq 5 \times T1$". When the time T2 is shorter than "$3 \times T1$", the length of time to perform the foregoing second step, that is, the operation of maintaining a flow rate (the time (Y) indicated by a horizontal portion of the graph in FIG. 1) becomes shorter, and the length of time to rapidly increase the flow rate becomes longer. As a result, an excellent cake layer is not formed. On the other hand, when the time T2 is longer than "$5 \times T1$", the time required for the start-up operation becomes longer, and accordingly a sufficient effect of preventing a decrease in the throughput in the dezincification plant is not attained.

Furthermore, in the case where a slurry flow rate is increased in stages in the time T2, the flow rate is preferably increased in not less than three stages and not more than six stages. When the flow rate is increased in less than three stages, the length of time to rapidly increase a slurry flow rate, that is, the time to perform the first step (X) becomes longer, and accordingly there is a risk that an excellent cake layer cannot be formed. Furthermore, since the length of time to rapidly increase a slurry flow rate is longer, a formed cake layer is in a state of being easily broken, and there is a risk that an appropriate flow path cannot be formed in the cake layer. On the other hand, when the flow rate is increased in more than six stages, a state in which a slurry flow rate is slowly increased on the whole is nearly brought about, and accordingly there is a risk that a sufficient effect of preventing a decrease in the throughput in the dezincification plant does not appear. Furthermore, the frequency of control (ON/OFF) of the liquid transfer pump inevitably increases, and accordingly there is a risk that an adverse impact on the life of the pump arises.

As mentioned above, in the present embodiment, the operation method for start-up of the dezincification plant is such that, when the slurry containing the zinc sulfide is supplied to the filter device, an adjustment is performed in such a manner that a slurry flow rate is increased in stages to reach a target flow rate within a predetermined time. This makes it possible to perform coating with a zinc sulfide to constitute a more excellent cake layer in a shorter time than in the conventional methods, and accordingly a decrease in the operating rate of the whole process due to a decrease in the throughput of the plant can be prevented.

<3-5. Nickel Recovery Step>

In the nickel recovery step S5, a sulfurizing agent such as hydrogen sulfide gas is blown into the mother liquor for nickel recovery which is obtained by separating and removing zinc as an impurity element in the form of zinc sulfide in the dezincification step S4, whereby a sulfurization reaction is induced to form a sulfide containing nickel and cobalt (a nickel-cobalt mixed sulfide) and a barren liquor.

The mother liquor for nickel recovery is a sulfuric acid solution obtained by reducing an impurity component in the leachate of the nickel oxide ore through the neutralization step S3 and the dezincification step S4, and for example, the mother liquor has a pH of 3.2 to 4.0, a nickel concentration of 2 to 5 g/L, and a cobalt concentration of 0.1 to 1.0 g/L. It should be noted that there is a possibility for approximately a few g/L of iron, magnesium, manganese, and the like to be contained as impurity components in this mother liquor for nickel recovery, but, these impurity components have lower stability as a sulfide with compared to nickel and cobalt which are to be recovered, and hence the impurity components are not contained in a formed sulfide.

In the nickel recovery step S5, a nickel-cobalt mixed sulfide containing less impurity component and a barren liquor in which the concentration of nickel is stabilized at a low level are formed and recovered. Specifically, a sedimentation treatment using a precipitator such as a thickening apparatus is applied to a slurry of the nickel-cobalt mixed sulfide obtained by the sulfurization reaction, whereby the nickel-cobalt mixed sulfide as a precipitate is separated and recovered from the bottom of the thickening apparatus. On the other hand, an aqueous solution component is made to overflow, thereby being recovered as a barren liquor. It should be noted that, as mentioned above, this barren liquor contains unsulfurized impurity elements of iron, magnesium, manganese, and the like.

4. EXAMPLES

Hereinafter, examples adopting the present invention will be described, but, the present invention is not limited to the following examples.

EXAMPLES

Example 1

After a periodic inspection was performed in the dezincification plant used in hydrometallurgy for nickel oxide ore, the following operation was performed at the time of start-up of the dezincification plant.

That is, there was performed an operation in which, in the start-up of the dezincification plant, the flow rate of a slurry supplied to a polishing filter constituting the plant was increased in stages, namely, in three stages (refer to FIG. 1). More specifically, a flow-rate-increasing step of increasing the flow rate of a slurry and a flow-rate-maintaining step of, after the flow rate is increased for a certain time, maintaining the flow rate at that point for a predetermined time were taken as one set (one stage), and this set was repeated three times (three stages were performed in succession), whereby an adjustment was performed to increase a slurry flow rate in stages. It should be noted that, in the flow-rate-increasing step in each of the stages, the flow rate was increased with setting the liquid transfer flow rate of a liquid transfer pump configured to transfer the slurry to the maximum (the maximum liquid transfer capacity). Furthermore, at the time when the flow rate of the slurry supplied reached a target flow rate which was a flow rate in a normal operation, the operation to increase the slurry flow rate was stopped and the flow rate was maintained at the target flow rate.

Here, the time (T2) to perform the foregoing operation of increasing the slurry in stages was set so as to satisfy the relation of "$3 \times T1 \leq T2 \leq 5 \times T1$", where T1 was the time between starting a slurry supply and attaining the target flow rate in the case of transferring the slurry at the maximum liquid transfer capacity of a liquid transfer pump. Specifically, in Example 1, the time T1 was 30 minutes; the time T2 was set to 2 hours; and the flow rate of the slurry was made to reach a target flow rate in the 2 hours.

As a result, the process for the start-up was surely completed in the 2 hours. The time required for the start-up (2 hours) was considerably shorter than that in the conventional method (refer to Comparative Example 1) in which a slurry flow rate was continuously and gradually increased to reach a target flow rate.

Furthermore, after the start-up was completed, operations were made to continue, and a filter cloth provided to a polishing filter was evaluated. The filter cloth was evaluated in such a manner that the difference between the pressure of the slurry supplied to the polishing filter and the pressure of the slurry discharged from the polishing filter, that is, a pressure difference therebetween was monitored to evaluate the state of clogging of the filter cloth. It should be noted that, at the time when the difference pressure reached 100 kPaG, reverse washing was performed. As a result, in Example 1, an approximately 6-day operation was able to be carried out before the first reverse washing, and the total amount of liquid flow during this period was 25,235 $m^3$. Furthermore, after the completion of this reverse washing, the filter cloth was kept in a reusable state.

Furthermore, during the operations on and after the start-up, the operating rate of the dezincification plant did not decrease, and the operating rate of the whole factory did not decrease.

Comparative Example 1

In Comparative Example 1, as shown in FIG. 3, the start-up was performed in such a manner that a slurry flow rate was continuously and gradually increased to reach a target flow rate. It should be noted that, except this, the same operations as in Example 1 were performed.

As a result, the time required for the start-up was 24 hours. Furthermore, immediately after starting an operation, the same amount of liquid flow as in Example 1 was secured, but, the amount of a process liquid supplied from the neutralization step as an upstream step was larger than the amount of liquid supplied to the polishing filter in the dezincification plant, and accordingly the liquid level in the post-dezincification solution storage tank used upstream step from the polishing filter rapidly rose, and as a result, an operation load had to be reduced to 80% of a design value, and accordingly the operating rate of the whole factory decreased.

Comparative Example 2

In Comparative Example 2, as shown in FIG. 4, the start-up operation was performed in such a manner that the liquid transfer flow rate of a liquid transfer pump configured to transfer a slurry was set to the maximum (the maximum liquid transfer capacity), and, with that liquid transfer flow rate being maintained, a target flow rate was attained. It should be noted that, except this, the same operations as in Example 1 were performed.

As a result, the time required for the start-up was 30 minutes, and hence the start-up was completed in a short time. However, when the filter cloth was, evaluated in the same manner as in Example 1, only a 2-day operation was able to be carried out before the first reverse washing, and the total amount of liquid flow during this period was 8,640 m³. Furthermore, after the completion of this reverse washing, the filter cloth could not be reused in spite of undergoing the reverse washing, and the filter cloth needed to be replaced.

The following table 1 shows the results brought about by each of the operation methods in Example 1, Comparative Example 1, and Comparative Example 2.

TABLE 1

| | Time required until filter start-up (Hr) | Total amount of liquid flow (m³) | Operation load during liquid flowing (%) |
|---|---|---|---|
| Example 1 | 2 | 25235 | 100 |
| Comparative Example 1 | 24 | 24453 | 80 |
| Comparative Example 2 | 0.5 | 8640 | 100 |

As shown in the foregoing results, it was found that, in the start-up of the dezincification plant, the flow rate of the slurry supplied to the filter device is adjusted to reach a target flow rate in stages within a predetermined time, whereby the start-up operation can be performed in a shorter time than in the conventional methods, and a decrease in the operating rate can be prevented. Furthermore, it was found that this method allows an excellent cake layer to be formed on the surface of the filter cloth and the life of the filter cloth to be made longer, whereby an efficient filtration treatment is made feasible.

The invention claimed is:

1. An operation method for a dezincification plant, the method comprising:
   leaching a nickel oxide ore containing zinc, nickel and cobalt;
   neutralizing of the leachate of the nickel oxide ore containing zinc, nickel and cobalt to obtain a post-neutralization solution;
   applying a sulfurization treatment to the post-neutralization solution to form a zinc, sulfide; and
   separating and removing the zinc sulfide,
   wherein, when, upon start-up of the dezincification plant, a slurry containing the zinc sulfide formed by adding a sulfurizing agent to the post-neutralization solution is supplied to a filter for filtration and separation, an adjustment is performed in such a manner that a flow rate of the slurry supplied to the filter is increased in stages to reach a target slurry flow rate in a time T2, which satisfies the following relational expression (i), $$3 \times T1 \leq T2 \leq 5 \times T1 \quad \text{(i)}$$

where T1 represents a minimum time between starting a slurry supply and attaining the target slurry flow rate in the case of transferring the slurry at a maximum liquid transfer capacity of a pump configured to transfer the slurry.

2. The operation method for the dezincification plant according to claim 1, wherein each of the stages has a step of increasing a slurry flow rate and a step of maintaining a slurry flow rate.

3. The operation method for the dezincification plant according to claim 2, wherein, in the step of increasing the slurry flow rate in each of the stages, said slurry flow rate is increased by transferring the slurry at the maximum liquid transfer capacity of the pump.

4. The operation method for the dezincification plant according to claim 1, wherein the slurry flow rate is adjusted so as to be increased in three stages to six stages.

5. An operation method for a dezincification plant, the method including a hydrometallurgical method for a nickel oxide ore comprising:
   a leaching step wherein sulfuric acid is added to a slurry of the nickel oxide ore to perform leaching under high temperature and high pressure;
   a solid-liquid separation step wherein multistage washing is applied to the slurry to separate a residue therefrom, whereby a leachate containing an impurity element together with nickel and cobalt is obtained;
   a neutralization step wherein a pH of the leachate is adjusted to separate a neutralized precipitate containing the impurity element therefrom, whereby a post-neutralization solution containing zinc together with nickel and cobalt is obtained;
   a dezincification step wherein a sulfurization treatment is applied to the post-neutralization solution to form a zinc sulfide, and said zinc sulfide is separated therefrom to obtain a mother liquor for nickel recovery which contains nickel and cobalt; and
   a nickel recovery step wherein a sulfurization treatment is applied to the mother liquor for nickel recovery to form a mixed sulfide containing nickel and cobalt,
   wherein, when, upon start-up of the dezincification plant, a slurry containing the zinc sulfide formed by adding a sulfurizing agent to the post-neutralization solution is supplied to a filter for filtration and separation,
   an adjustment is performed in such a manner that a flow rate of the slurry supplied to the filter is increased in stages to reach a target slurry flow rate in a time T2, which satisfies the following relational expression (i), $$3 \times T1 \leq T2 \leq 5 \times T1 \quad \text{(i)}$$

where T1 represents a minimum time between starting a slurry supply and attaining the target slurry flow rate in the case of transferring the slurry at a maximum liquid transfer capacity of a pump configured to transfer the slurry.

* * * * *

UNITED STATES PATENT AND TRADEMARK OFFICE
CERTIFICATE OF CORRECTION

PATENT NO. : 9,751,035 B2  
APPLICATION NO. : 14/760066  
DATED : September 5, 2017  
INVENTOR(S) : Hiroyuki Mitsui et al.

Page 1 of 1

It is certified that error appears in the above-identified patent and that said Letters Patent is hereby corrected as shown below:

On the Title Page

Item (73), please change "Sumitomo Wiring Systems, Limited" to --Sumitomo Metal Mining Co., Ltd.--.

Signed and Sealed this
Twenty-ninth Day of May, 2018

Andrei Iancu
*Director of the United States Patent and Trademark Office*